United States Patent [19]
Horng

[11] Patent Number: 6,040,649
[45] Date of Patent: Mar. 21, 2000

[54] SUPPORT STRUCTURE APPARATUS FOR A SPINDLE MOTOR OF A COMPACT DISC MACHINE

[75] Inventor: Alex Horng, Kaohsiung, Taiwan

[73] Assignee: Sunonwealth Electric Machine Industry Co., Ltd., Taiwan

[21] Appl. No.: 09/295,476

[22] Filed: Apr. 19, 1999

[30] Foreign Application Priority Data

Jan. 11, 1999 [TW] Taiwan ................................. 88200347

[51] Int. Cl.[7] ............................. H02K 5/00; H02K 5/16; H02K 7/00; G11B 17/08; G11B 5/016

[52] U.S. Cl. ........................... 310/91; 310/67 R; 310/90; 360/98.08; 360/99.05; 360/99.12

[58] Field of Search ..................... 310/91, 66, 67 R, 310/90, 261, 267, 156; 360/98.07, 98.08, 99.04, 99.05, 99.08, 99.12; 359/198, 199, 200; 248/349.1

[56] References Cited

U.S. PATENT DOCUMENTS

| | | | |
|---|---|---|---|
| 3,922,590 | 11/1975 | Warren et al. .......................... | 318/138 |
| 4,007,390 | 2/1977 | Muller et al. ............................ | 310/90 |
| 4,649,306 | 3/1987 | Yamashita ............................... | 310/90 |
| 4,682,065 | 7/1987 | English et al. ........................... | 310/90 |
| 4,918,545 | 4/1990 | Scheffel ................................ | 360/98.08 |
| 5,210,665 | 5/1993 | Nishizawa .............................. | 360/99.08 |
| 5,275,498 | 1/1994 | Hibbard ................................. | 403/24 |
| 5,457,676 | 10/1995 | Park ..................................... | 369/270 |
| 5,486,962 | 1/1996 | Boutaghou ............................. | 360/99.12 |
| 5,497,281 | 3/1996 | Jewell et al. ........................... | 360/98.08 |
| 5,633,856 | 5/1997 | Mukawa ................................ | 369/270 |
| 5,644,419 | 7/1997 | Choi ..................................... | 359/198 |
| 5,757,584 | 5/1998 | Schick .................................. | 360/99.08 |
| 5,834,868 | 11/1998 | Yoshikawa et al. .................... | 310/67 R |
| 5,875,069 | 2/1999 | Suzuki et al. .......................... | 360/99.04 |

*Primary Examiner*—Nestor Ramirez
*Assistant Examiner*—Dang Dinh Le
*Attorney, Agent, or Firm*—Chan Law Group LC; Steve A. Wong

[57] ABSTRACT

A support structure for a spindle motor of a compact disc machine, generally comprising a shaft, a rotor base, a support plate and a binding member. The shaft is disposed through a centrally located hole in the rotor base. The support plate is disposed on the rotor base and supports the compact disc. The binding member is elastic and is cast or injection-molded to bind the shaft, the rotor base and the support plate together, such that the shaft, the rotor base, the support plate are securely affixed in position. The binding member includes a means for receiving the hole of a compact disc.

19 Claims, 4 Drawing Sheets

SUPPORT STRUCTURE APPARATUS FOR A SPINDLE MOTOR OF A COMPACT DISC MACHINE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The invention pertains generally to compact disc drive mechanisms, and more particularly to a support structure for a spindle motor of a compact disc machine.

2. Description of the Background Art

The conventional support structure for a spindle motor of a compact disc machine typically consist of a spindle motor assembly having a rotor base, a shaft and a support plate. A circular hub is mounted over the spindle motor and receives the axial hole of a compact disc. It is conventional practice to utilize a metal plate press to bind the rotor base, the shaft and the support plate together. However, such a binding method is incapable of achieving a high degree of precision. Additionally, the assembled spindle motor often fails to meet baseline standards.

After a period of usage, loosening and separation among the components occur, and thus, reliability of the spindle motor and support structure becomes a problem. Additionally, during the manufacturing process of the spindle motor, the shaft, which must be positioned perpendicular relative to the support plate, has a tendency to incline off a perpendicular orientation relative to the support plate. An inclined shaft causes an eccentric vibration of the rotor base and results in inducing vibration throughout the entire support structure of the spindle motor. Such vibration accentuates the loosening and separation among the components.

A problem also exists with the circular hub, which serves the function of maintaining the compact disc concentrically over the support structure and securing the disc thereon. The circular hub typically has metallic spheres disposed circumferentially at evenly spaced intervals around the circular hub for locking the hole of a disc securely on the support structure. In order, however, for the metallic spheres to engage and lock the compact disc, each metallic sphere must provide some degree of elasticity or resiliency. This elasticity or resiliency is accomplished with a rubber ring inserted within the circular hub to resist and absorb movements inward radial movement of the metallic spheres as the hole of the compact disc engages the circular hub. This rubber ring, however, detaches very easily such that the metallic spheres lose their elastic capability, thereby destroying one of the hub's functions.

Thus, there exist a need for a spindle motor support structure that is capable precisely and reliably binding the shaft, rotor base and support plate together, as well as to reliably engage and secure a compact disc on the support structure. The present invention satisfies these needs, as well as others, and generally overcomes the deficiencies presently known to exist.

BRIEF SUMMARY OF THE INVENTION

The present invention generally comprises an apparatus for supporting a compact disc on a spindle motor. By way of example, and not of limitation, the invention comprises a shaft, a rotor base, a support plate and a binding member. The support plate is disposed over the rotor base, which includes a hole disposed thereon.

The binding member has elastic properties and securely fastens the support and rotor base together, while also affixing the shaft in a generally perpendicular position relative to the support plate. The binding member includes an upwardly extending hub which is adapted to receive the hole of a compact disc that is placed upon the support plate. As an alternative embodiment, the hub may incorporate resilient hooks to better lock the compact disc onto the support plate. As yet another alternative embodiment, the hub may also incorporate an elastic ring member fitted into an annular space between a central upper portion of the hub and the hooks. The elastic ring member adds greater resiliency to the hooks, thereby increasing the durability of the hooks. In this embodiment, each hook has a tab extending inwardly towards the central portion to prevent the elastic ring member from coming loose during rotation of the support plate.

The support plate and binding member may be an integral unit, thereby combining two components into one. As such, the apparatus would require fewer individual components and be more reliable, while improving the manufacturing efficiency.

An object of the present invention is to provide a support structure for a spindle motor such that the components of the support structure are securely attached together.

Another object of the present invention is to provide a support structure for a spindle motor such that the components of the support structure are reliably attached together.

Still another object of the present invention is to provide a support structure for a spindle motor such that a compact disc can be securely affixed onto the support structure.

Still another object of the present invention is to provide a support structure for a spindle motor such that the motor and support structure is capable of a precisely balanced rotation.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts without departing from the basic concepts as disclosed herein.

Figure 1:
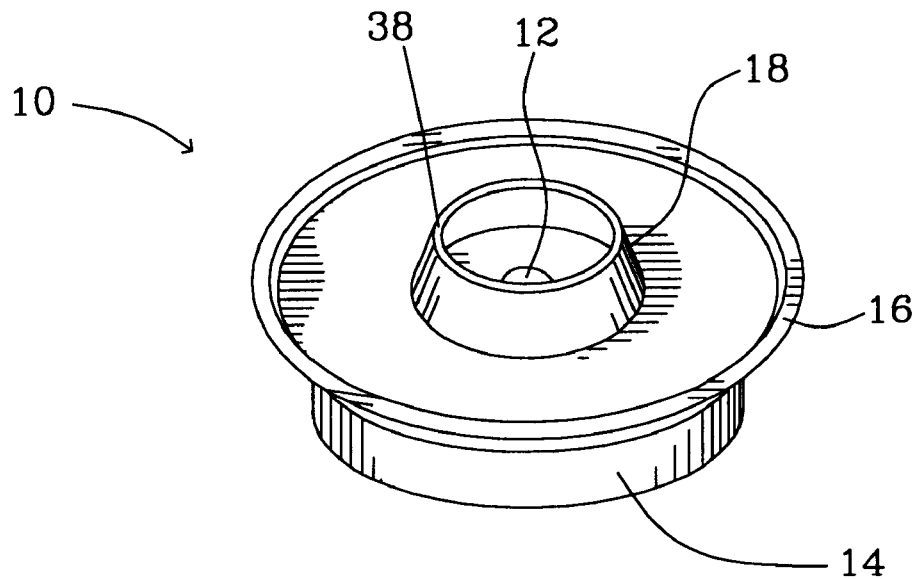
FIG. 1 is a perspective view of a support structure apparatus for a spindle motor in accordance with the present invention.
Figure 2:
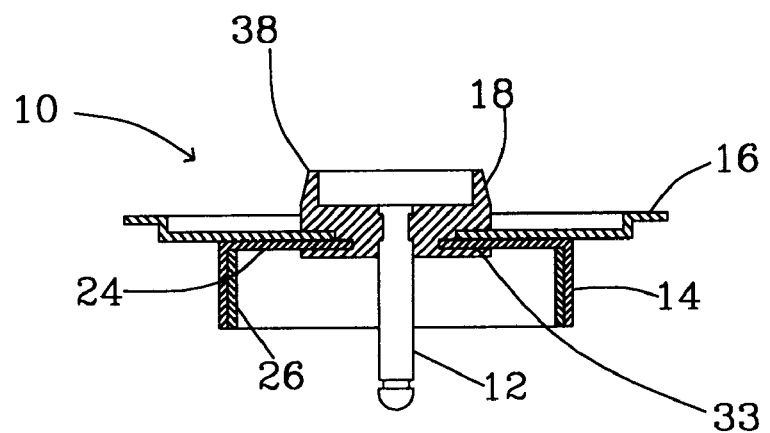
FIG. 2 is a cross-sectional view of the apparatus shown in FIG. 1.
Figure 3:
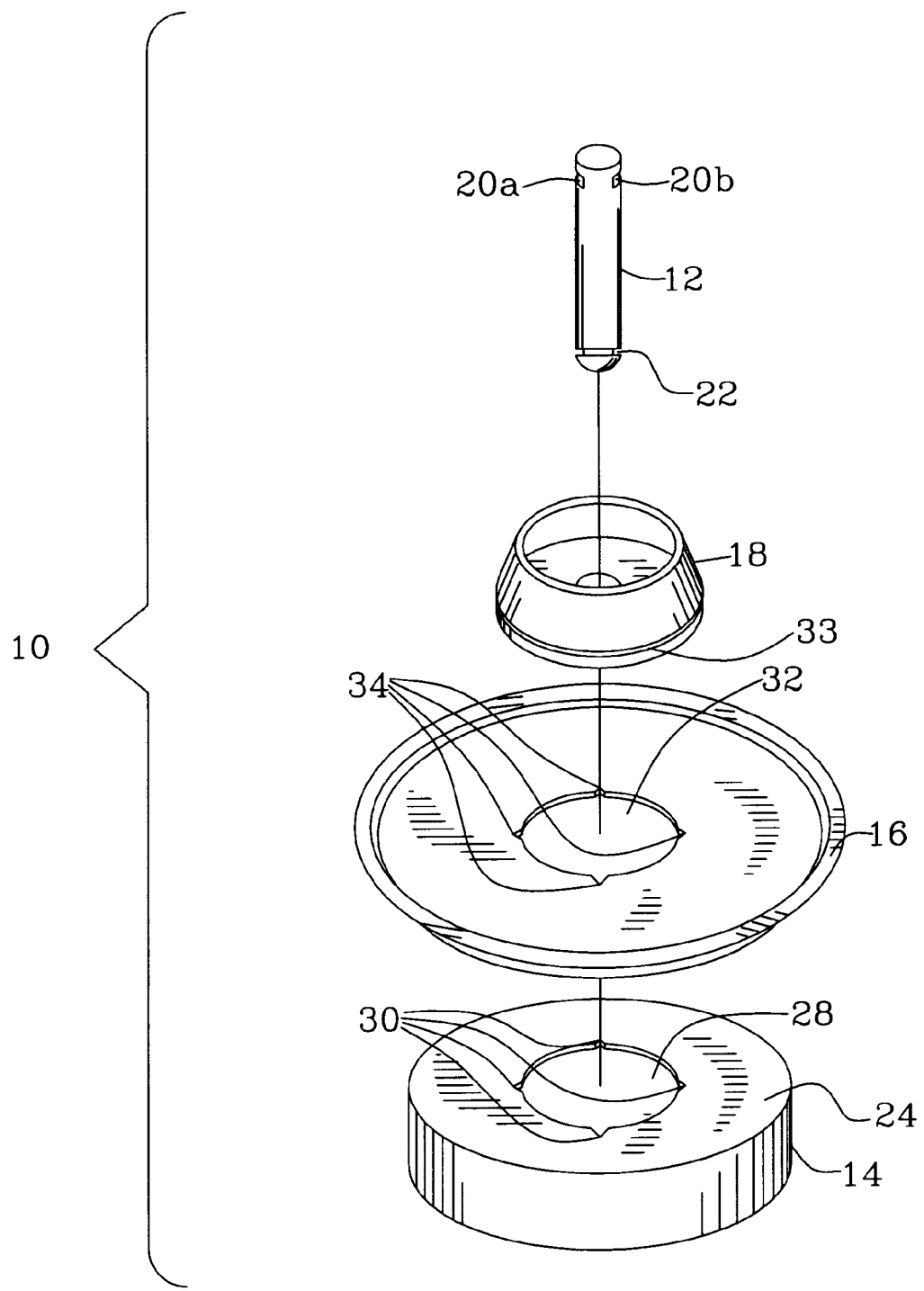
FIG. 3 is a an exploded view of the apparatus shown in FIG. 1.

Referring first to FIG. 1 through FIG. 3, a support structure apparatus 10 for a spindle motor of a compact disc machine, in accordance with the present invention is generally shown. Apparatus 10 comprises a shaft 12, a rotor base 14, a support plate 16 and a binding member 18.

Shaft 12 incorporates a pair of slots 20a and 20b disposed adjacent one end thereof and an annular groove 22 disposed adjacent opposite end of shaft 12. Annular groove 22 of shaft is structured and configured to receive a C-shaped ring (not shown) adapted for attachment onto shaft 12 to affix shaft 12 within bearing of a stator structure (not shown) of a spindle motor.

Rotor base 14 is generally annular and includes an upper surface 24. A magnet ring 26 is circumferentially disposed within rotor base 14. Magnet ring 26 accomplishes the function of producing electromagnetic induction to rotate rotor base 14 when an electromagnetic coil (not shown) of the stator is in place within rotor base 14. Upper surface 24 of rotor base 14 incorporates a centrally disposed hole 28 to accommodate shaft 12. There are four evenly spaced notches 30 formed around the periphery of hole 28.

Support plate 16 is generally disc-shaped and is positioned on upper surface 24 of rotor base 14. Support plate 16 also incorporates a centrally disposed hole 32 to accommodate the passage of shaft 12 therethrough. Similarly, hole 32 of support plate 16 also includes four evenly spaced notches 34 formed around its periphery.

Binding member 18 comprises a substructure 36 and a circular hub 38. Substructure 36 of binding member 18 effectively secures shaft 12, rotor base 14 and support plate 16 in a relatively fixed orientation. Circular hub 38 extends upwardly from substructure 36 and is specifically configured to receive the hole (not shown) of the compact disc.

Binding member 18 binds or secures shaft 12, rotor base 14 and support plate 16 together once shaft 12 is properly positioned through both hole 28 of rotor base 14 and hole 32 of support plate 16, in a precisely perpendicular orientation relative to support plate 16 and upper surface 24 of rotor base 14.Binding member 18 incorporates a recess 33, within which rotor base 14 and support plate 16 are disposed. Binding member 18 is an elastic material which is formed by a cast or injected mold. Binding member 18 is preferably plastic but may also be fabricated of bakelite, aluminum or like material. Slots 20a and 20b of shaft 12 provide for a means for shaft 12 to better adhere to binding member 18. Similarly, notches 30 of rotor base 14 and notches 34 of support plate 16 also provide for a means for rotor base 14 and support plate 16, respectively, to better adhere to binding member 18. Use of binding member 18 provide for a more precise concentric positioning of shaft 12 through rotor base 14 and support plate 16, thereby eliminating the eccentric vibrations problems associated with convention designs. Moreover, by virtue of binding member 18 having elastic properties, the adhesion among shaft 12, rotor base 14 and support plate 16 is so substantial such that the problem of loosening and separation among the aforementioned components is also thereby eliminated.

As a variation which would improve the efficiency of manufacturing and assembly, support plate 16 and binding member 18 may be formed as an integral unit by cast or injection mold, thereby combining the two parts. As such, apparatus 10 would required fewer components, be more reliable and is easier to assemble.

Figure 4:
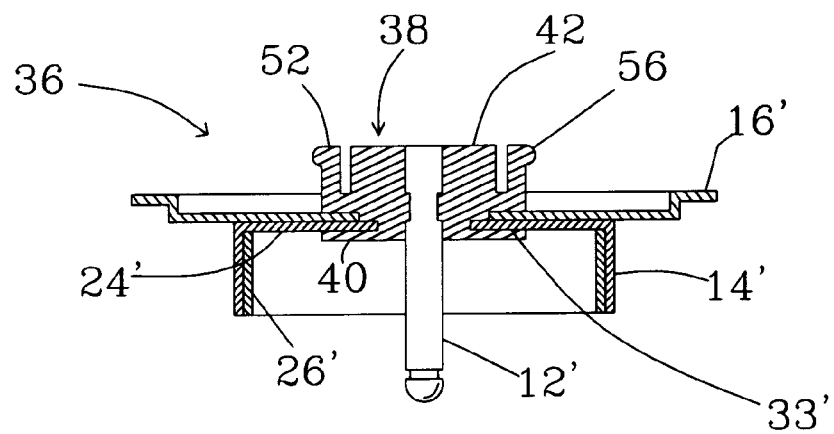
FIG. 4 is a cross-sectional view of a second embodiment of a support structure apparatus for a spindle motor in accordance with the present invention.
Figure 5:
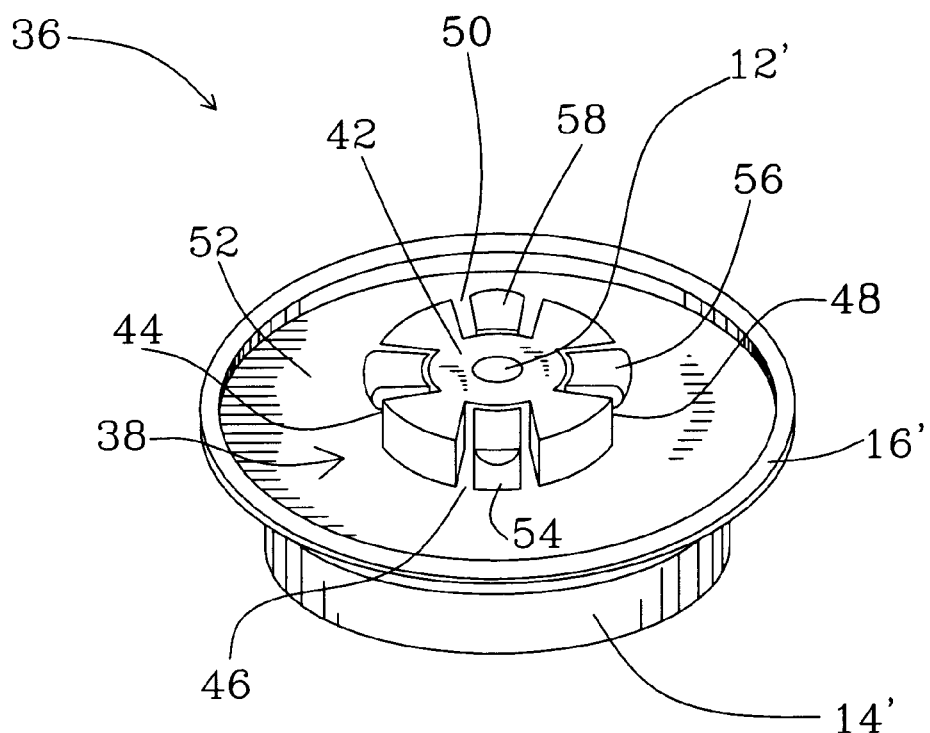
FIG. 5 is a perspective of the apparatus shown in FIG. 4.

Referring also to FIG. 4 and FIG. 5, a second embodiment of a support structure apparatus 36 for a spindle motor of a compact disc machine, in accordance with the present invention is generally shown. Apparatus 36 generally comprises a shaft 12', a rotor base 14', a support plate 16' and a binding member 38.

Rotor base 14' is generally annular and includes an upper surface 24'. A magnet ring 26' is circumferentially disposed within rotor base 14'. Magnet ring 26' accomplishes the function of producing electromagnetic induction to rotate rotor base 14' when an electromagnetic coil (not shown) of the stator is in place within rotor base 14'.

Binding member 38 comprises a substructure 40 and a central hub 42. Binding member 38 secures shaft 12', rotor base 14' and support plate 16' in a fixed position, wherein substructure 40 binds shaft 12', rotor base 14' and support plate 16'. Central hub 42 extends upwardly from substructure 40 and is generally circular shaped to receive the hole of a compact disc (not shown). Binding member 38 incorporates a recess 33', within which rotor base 14' and support plate 16' are disposed. Binding member 38 is an elastic material which is formed by a cast or injected mold. Binding member 38 is preferably plastic but may also be fabricated of bakelite, aluminum or like material.

Central hub 42 further comprises four notches 44, 46, 48 and 50 evenly spaced therearound. Located within each notch 44, 46, 48 and 50 is a hook 52, 54, 56 and 58, respectively, that extend upwardly from substructure 40. Hooks 52, 54, 56 and 58 are resilient to better engage the hole of a compact disc. A protrusion extending radially from the upper end of each hook 52, 54, 56 and 58 slightly increases the outer diameter of hub 42 at that section to help hub 42 lock a compact disc engaged thereon onto support plate 16'.

As a variation, support plate 16, and binding member 38 may be formed as an integral unit by cast or injection mold, thereby combining the two parts. As such, apparatus 36 would required fewer components, be more reliable and is easier to assemble.

Figure 6:
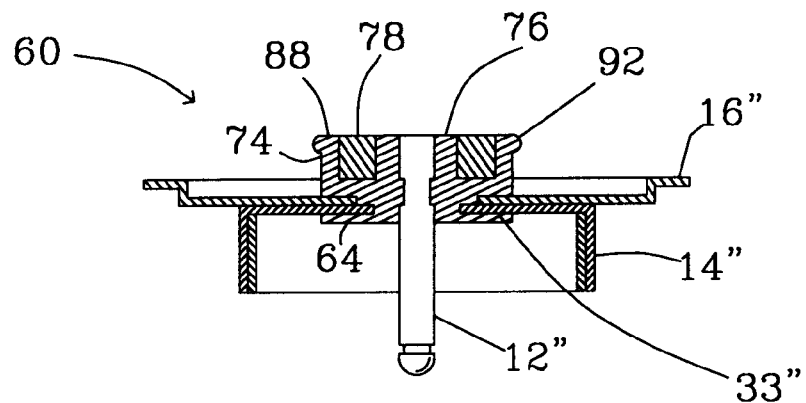
FIG. 6 is a cross-sectional view of a third embodiment of a support structure apparatus for a spindle motor in accordance with the present invention.
Figure 7:
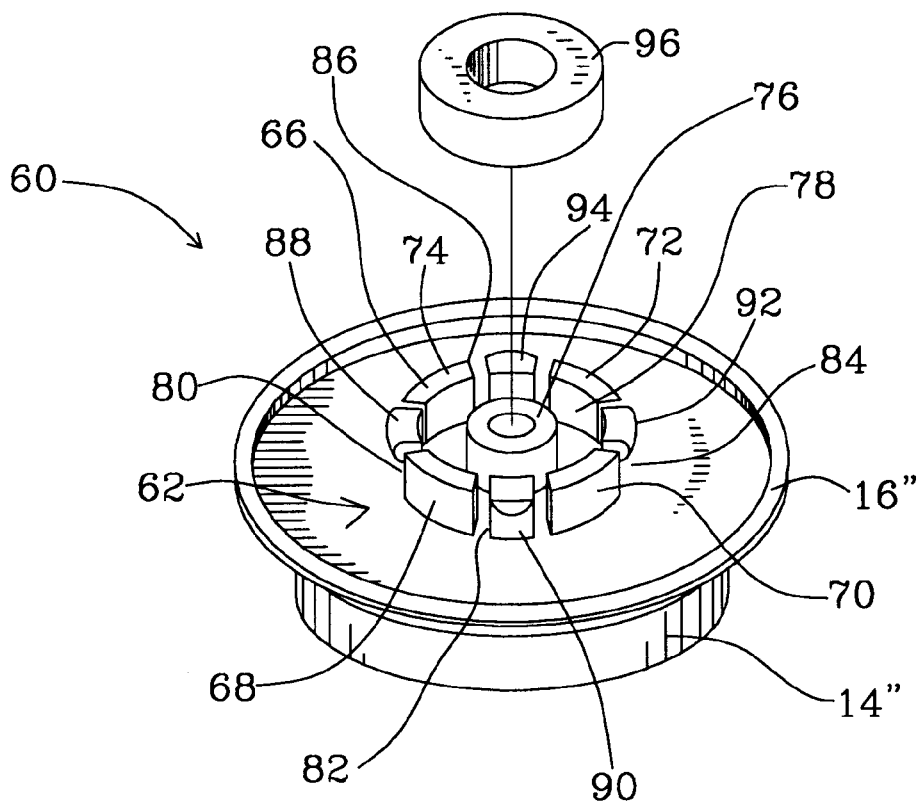
FIG. 7 is a perspective of the apparatus shown in FIG. 6.

Referring also to FIG. 6 and FIG. 7, a third embodiment of a support structure apparatus 60 for a spindle motor of a compact disc machine, in accordance with the present invention is generally shown. Apparatus 60 generally comprises a shaft 12", a rotor base 14", a support plate 16" and a binding member 62.

Binding member 62 comprises a substructure 64 and a central hub 66. Binding member 62 secures shaft 12", rotor base 14" and support plate 16" in a fixed position, wherein substructure 64 binds shaft 112", rotor base 14" and support plate 16". Central hub 66 extends upwardly from substructure 64 and is generally circular shaped to receive the hole of a compact disc (not shown). Binding member 62 incorporates a recess 33", within which rotor base 14" and support plate 16" are disposed. Binding member 62 is an elastic material which is formed by a cast or injected mold. Binding member 62 is preferably plastic but may also be fabricated of bakelite, aluminum or like material.

Central hub 66 further comprises four blade shaped elements 68, 70, 72 and 74 as well as a central portion 76. Blade shaped elements 68, 70, 72 and 74 extend upwardly from substructure 64 and are disposed around central portion 76, thereby defining an annular space 78 therebetween. A plurality of notches 80, 82, 84 and 86 are defined between each of blade-shaped elements 68, 70, 72 and 74 and hooks 88, 90, 92 and 94, respectively, are disposed therein. Protrusions extending radially from the upper end of hooks 88, 90, 92 and 94 slightly increase the outer diameter of hub 62 at that section to help hub 62 lock a compact disc engaged thereon onto support plate 16". An elastic ring member 96 is inserted into annular space 78 to give hooks 88, 90, 92 and 94 an increased resiliency and durability. Each blade shape element 68, 70, 72 and 74 may incorporate a tab (not shown) that extends towards central portion 76 to help prevent elastic ring member 96 from coming loose during rotation of support plate 16".

Accordingly, it will be seen that this invention securely and reliably binds together a shaft, rotor base and support of a support structure for a spindle motor used in a compact disc machine. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A support structure apparatus for a spindle motor, comprising:
   (a) a rotor base having a first centrally disposed hole therein;
   (b) a support plate having a second centrally disposed hole therein, said support plate adjacent said rotor base;
   (c) a shaft passing through said first and said second hole, said shaft including at least one slot disposed thereon;
   (d) a binding member for securing said shaft, said rotor base, and said support plate in a fixed position, said binding member disposed around said slot and said shaft, whereby said slot provides for enhanced securement of said binding member to said shaft, said binding member including a recess for securing said rotor base and said support plate adjacent each other and to said binding member; and
   (e) a hub extending from said binding member, said hub adapted to receive a compact disc therearound.

2. An apparatus as recited in claim 1, wherein said hub further comprises:
   (a) a plurality of notches disposed therearound; and
   (b) an equal plurality of upwardly extending hooks disposed within each said notch.

3. An apparatus as recited in claim 1, wherein said hub further comprises:
   (a) a central portion;
   (b) a plurality of upwardly extending blade-shaped elements disposed around said central portion, thereby defining an annular space therebetween;
   (c) a plurality of notches defined between each blade-shaped element; and
   (d) a hook disposed within each said notch.

4. An apparatus as recited in claim 3, each said plurality of upwardly extending blade-shaped elements includes a protrusion extending toward said hub.

5. An apparatus as recited in claim 3, further comprising an elastic ring member within said annular space.

6. An apparatus as recited in claim 1, wherein said first hole of said rotor base includes at least one notch, said notch providing for enhanced securement to said binding member.

7. An apparatus as recited in claim 1, wherein said second hole of said support plate includes at least one notch, said notch providing for enhanced securement to said binding member.

8. An apparatus as recited in claim 1, wherein said support plate and said binding member are integrally formed as a single unit.

9. An apparatus as recited in claim 1, wherein said support plate and said binding member are integrally formed as a single unit.

10. A support structure apparatus for a spindle motor, comprising:
    (a) a rotor base having an upper surface, said upper surface including a first hole centrally disposed thereon;
    (b) a support plate disposed on said upper surface of said rotor base, said support plate including a second hole disposed thereon, said second hole generally overlapping said first hole of said upper surface;
    (c) a shaft passing through said first and said second hole said shaft including at least on slot disposed thereon;
    (d) a binding member disposed through said first hole and said second hole, said binding member disposed around said slot and said shaft to secure said shaft thereon, said binding member including a recess for securing said rotor base and said support plate adjacent each other and to said binding member in a fixed position, and
    (e) hub extending from said binding member and protruding from said support plate, said hub configured to receive a compact disc therearound.

11. An apparatus as recited in claim 10, wherein said hub further comprises:
    (a) a plurality of notches disposed therearound; and
    (b) an equal plurality of upwardly extending hooks disposed within each said notch.

12. An apparatus as recited in claim 10, wherein said hub further comprises:
    (a) a central portion;
    (b) a plurality of upwardly extending blade-shaped members disposed around said central portion, thereby defining an annular space therebetween;
    (c) a plurality of notches defined between each said blade-shaped element; and
    (d) a hook disposed within each said notch.

13. An apparatus as recited in claim 12, wherein each said plurality of upwardly extending blade-shaped elements includes a protrusion extending toward said hub.

14. An apparatus as recited in claim 12, further comprising an elastic ring member within said annular space.

15. A support structure apparatus for a spindle motor, comprising:
    (a) a rotor base having an upper surface, said upper surface including a centrally disposed hole;
    (b) a shaft passing through said hole of said rotor base, said shaft including a pair of slots disposed thereon;
    (c) a support plate disposed on said upper surface of said rotor base, said support plate including an integrally formed binding member, said binding member including a recess for securing said rotor base adjacent said support plate and to said binding member while maintaining said shaft in a fixed position by enveloping said slots on said shaft, thereby providing enhanced securement of said shaft onto said binding member; and
    (d) a hub for receiving a compact disc, said hub incorporated on said binding member.

16. An apparatus as recited in claim 15, wherein said hub further comprises:
   (a) a plurality of notches disposed therearound; and
   (b) an equal plurality of upwardly extending hooks disposed within each said notch.

17. An apparatus as recited in claim 15, wherein said hub further comprises:
   (a) a central portion;
   (b) a plurality of upwardly extending blade-shaped elements disposed around said central portion, thereby defining an annular space therebetween;
   (c) a plurality of notches defined between each said blade-shaped element; and
   (d) a hook disposed within each said notch.

18. An apparatus as recited in claim 17, wherein each said plurality of upwardly extending blade-shaped elements includes a protrusion extending toward said hub.

19. An apparatus as recited in claim 17, further comprising an elastic ring member within said annular space.

* * * * *